United States Patent
Kim et al.

(10) Patent No.: US 8,335,438 B2
(45) Date of Patent: Dec. 18, 2012

(54) ESTIMATING FREQUENCY OFFSET USING A FEEDBACK LOOP

(75) Inventors: Inwoong Kim, Allen, TX (US); Takao Naito, Plano, TX (US)

(73) Assignee: Fujitsu Limited, Kawasaki-shi (JP)

(*) Notice: Subject to any disclaimer, the term of this patent is extended or adjusted under 35 U.S.C. 154(b) by 351 days.

(21) Appl. No.: 12/609,177

(22) Filed: Oct. 30, 2009

(65) Prior Publication Data

US 2011/0103529 A1 May 5, 2011

(51) Int. Cl.
*H04B 10/00* (2006.01)

(52) U.S. Cl. ........ 398/154; 398/162; 398/163; 398/202; 398/203; 398/204; 398/205; 398/206; 398/207; 398/208; 398/209

(58) Field of Classification Search .................. 375/316, 375/322–333, 344; 398/65, 158, 202–209, 398/213, 154, 162, 163
See application file for complete search history.

(56) References Cited

U.S. PATENT DOCUMENTS

| | | | | |
|---|---|---|---|---|
| 5,590,158 A | * | 12/1996 | Yamaguchi et al. | 375/331 |
| 6,278,730 B1 | * | 8/2001 | Tsui et al. | 375/224 |
| 7,428,267 B2 | * | 9/2008 | Lee et al. | 375/260 |
| 7,529,295 B1 | * | 5/2009 | Nezami | 375/226 |
| 7,809,083 B1 | * | 10/2010 | Wu et al. | 375/316 |
| 7,899,340 B1 | * | 3/2011 | Bontu et al. | 398/209 |
| 2007/0036555 A1 | * | 2/2007 | Chen et al. | 398/188 |
| 2009/0142076 A1 | * | 6/2009 | Li et al. | 398/208 |
| 2009/0285137 A1 | * | 11/2009 | Fujita et al. | 370/310 |

OTHER PUBLICATIONS

Andreas Leven, et al., "Frequency Estimation in Intradyne Reception", IEEE Photonics Technology Letters, vol. 19, No. 6, pp. 366-368, Mar. 15, 2007.
Lei Li, et al., "Wide-range, Accurate and Simple Digital Frequency Offset Compensator for Optical Coherent Receivers", OWT4.pdf, OFC/NFOEC, © 2008 Optical Society of America, 3 pages, 2008.

* cited by examiner

*Primary Examiner* — Sam K Ahn
*Assistant Examiner* — Sophia Vlahos
(74) *Attorney, Agent, or Firm* — Baker Botts L.L.P.

(57) ABSTRACT

According to particular embodiments, a signal communicated from a transmitter to a receiver is received. A frequency offset estimate of the signal is determined. The frequency offset estimate indicates a frequency difference between the transmitter and the receiver. The frequency offset estimate is provided as feedback. A next frequency offset is compensated for according to the feedback.

20 Claims, 8 Drawing Sheets

ESTIMATING FREQUENCY OFFSET USING A FEEDBACK LOOP

TECHNICAL FIELD

This invention relates generally to the field of communications and more specifically to estimating frequency offset using a feedback loop in digital signal processing.

BACKGROUND

In communication networks, a receiver demodulates a carrier wave from a transmitter to retrieve information communicated by the carrier wave. To demodulate the carrier wave, frequency and phase differences between a carrier wave and a receiver may be estimated.

SUMMARY OF THE DISCLOSURE

In accordance with the present invention, disadvantages and problems associated with previous techniques for estimating a frequency offset may be reduced or eliminated.

According to particular embodiments, a signal communicated from a transmitter to a receiver is received. A frequency offset estimate of the signal is determined. The frequency offset estimate indicates a frequency difference between the transmitter and the receiver. The frequency offset estimate is provided as feedback. A next frequency offset is compensated for according to the feedback.

Certain embodiments of the invention may provide one or more technical advantages. A technical advantage of one embodiment may be that a frequency offset estimator provides a frequency offset estimate of a signal as feedback to a frequency offset compensator. The feedback allows the frequency offset compensator to more effectively compensate for the frequency offset. Another technical advantage of one embodiment may be that the feedback may be provided to the frequency offset compensator either before or after equalizing the signal. Another technical advantage of one embodiment may be that the frequency offset estimator may provide the estimate without calculating the m-th power of the signal, where m represents m-ary phase-shift keying.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1A through 5 of the drawings, like numerals being used for like and corresponding parts of the various drawings.

Figure 1A:
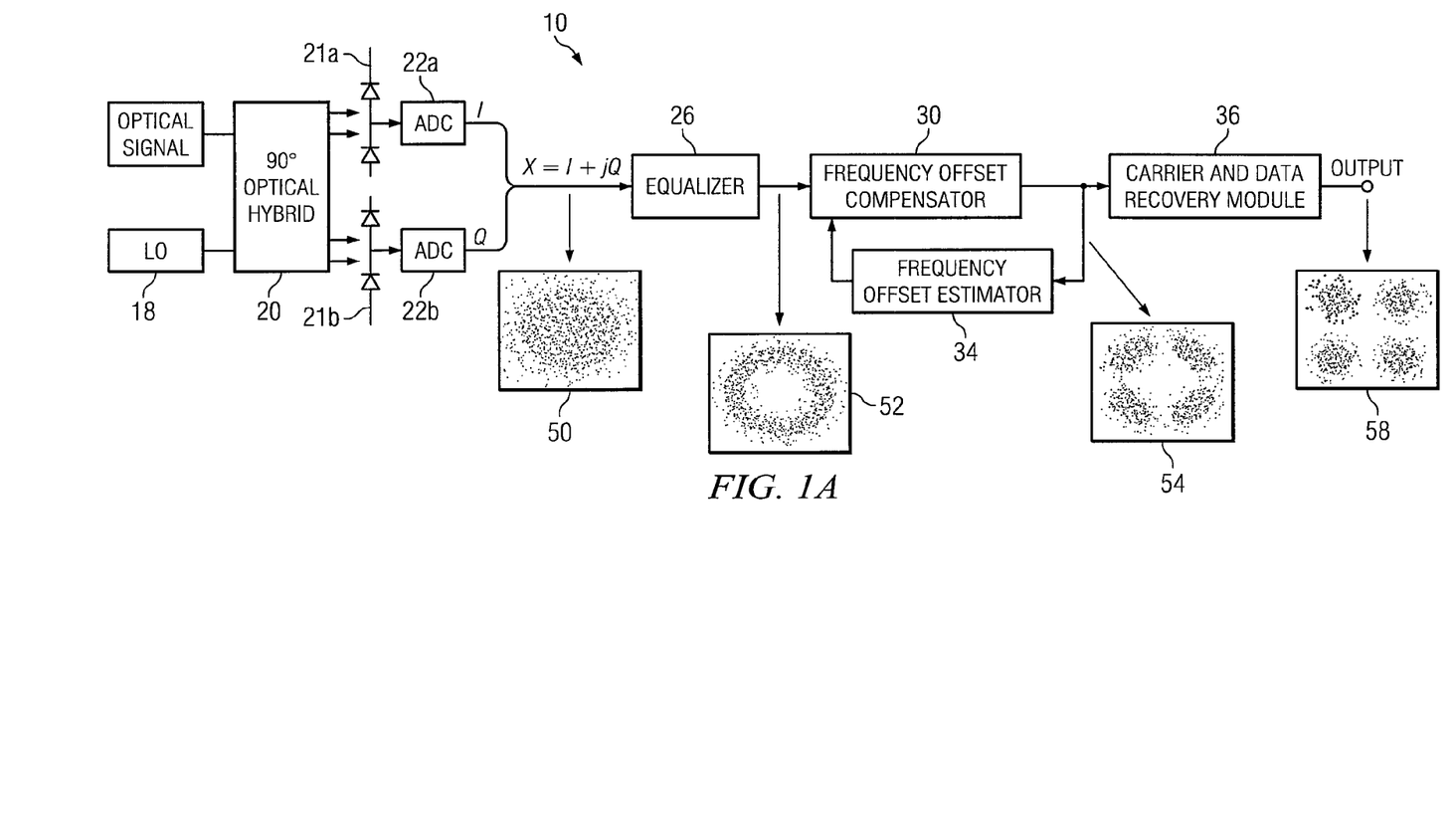
FIGS. 1A though 1C illustrate examples of systems that compensate for frequency offset using a frequency offset estimate provided after equalization.
Figure 1B:
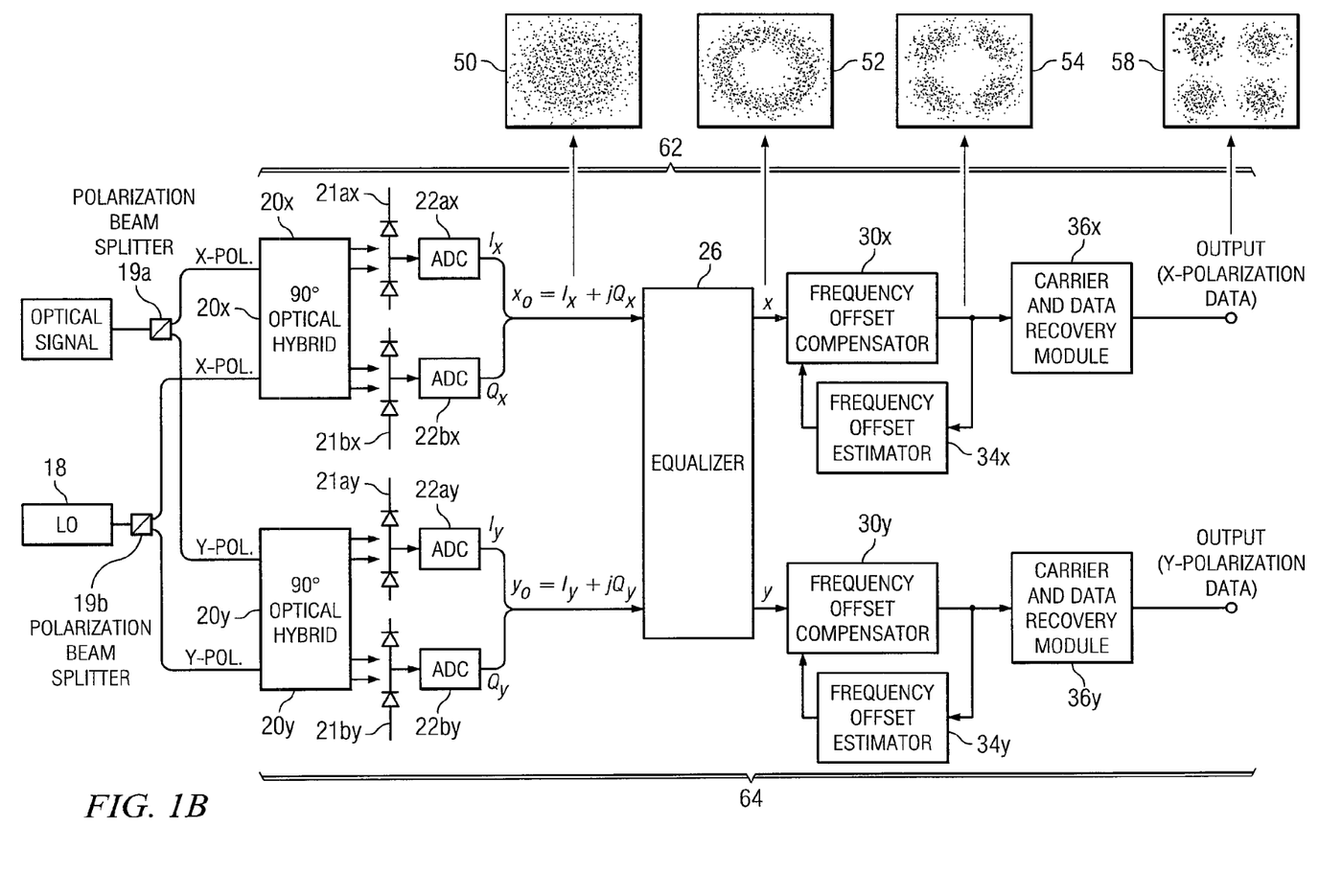
Figure 1C:
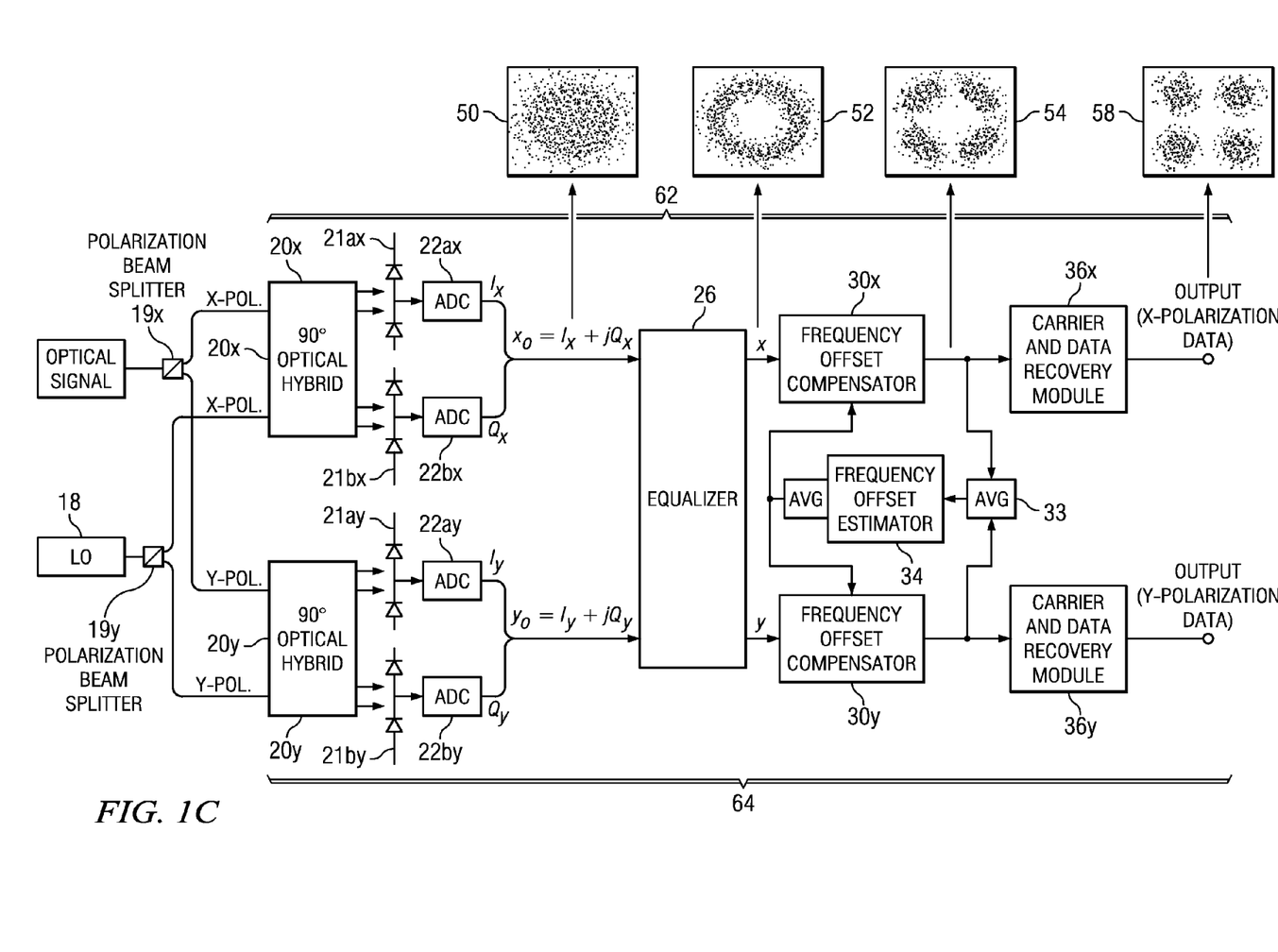

FIGS. 1A through 1C illustrate examples of systems 10 that compensate for frequency offset of a signal using a frequency offset estimate provided as feedback after equalizing the signal. The feedback may yield more effective frequency offset compensation without calculating the m-th power of the signal.

In particular embodiments, system 10 processes signals, such as optical signals sent by a transmitter and received at a receiver. An optical signal may have a frequency of approximately 1550 nanometers. Signals may be communicated over a channel, which is a communication path having a defined bandwidth such as a specific wavelength range.

A signal may communicate any suitable information, (for example, voice, data, audio, video, multimedia, and/or other information) using any suitable modulation format at any suitable data rate (for example, 10, 20, 40, 100, or over 100 gigabits per second (Gb/s)). Signals may be modulated using any suitable modulation scheme, such as phase-shift keying (PSK), for example, binary phase-shift keying (BPSK), quadrature phase-shift keying (QPSK), differential phase-shift keying (DPSK). The information may be communicated in packets communicated using any suitable protocol.

In particular embodiments, system 10 may be implemented with a receiver (for example, a coherent optical receiver) that uses feed-forward carrier recovery. The frequency offset between the local oscillator of the receiver and the laser of the transmitter may be estimated using a feedback loop, and may be used to calculate the phase error for carrier recovery. To estimate the frequency offset, data may be estimated using differential decoding (instead of using an estimated phase error) and removed from a signal, and the frequency offset may be estimated from the remaining signal. The frequency offset may be estimated and compensated for using digital signal processing.

Referring to FIG. 1A, in particular embodiments, system 10 includes a local oscillator (LO) 18, a 90° optical hybrid 20, detectors 21 (21a, 21b), analog-to-digital converters (ADCs) 22 (22a, 22b), an equalizer 26, a frequency offset compensator 30, a frequency offset estimator 34, and a carrier and data recovery module 36.

In particular embodiments, optical hybrid 20 receives an incoming signal from a transmitter and a reference signal from local oscillator 18. The optical signal may have an angular frequency of $\omega_s$, and the reference signal may have an angular frequency of $\omega_{LO}$. Optical hybrid 20 mixes the incoming signal with states (for example, quadratural states) associated with the reference signal in the complex-field space and sends the light signals (for example, four light signals) to balanced detectors 21. Detectors 21 generate electrical signals from the light signals and combine and send the electrical signal to analog-to-digital converters 22. Analog-to-digital converters 22 convert the analog signal to a digital signal, which may be described by a constellation diagram 50. Equalizer 26 reduces inter-symbol interference. Equalizer 26 may compensate for transmission impairment, which may yield a signal with a constellation diagram 52. Constellation diagram 52 indicates that the frequency offset has rotated the data.

In particular embodiments, frequency offset compensator 30 receives the signal from equalizer 26 and compensates for a frequency offset of the signal, which may yield a signal with a constellation diagram 54. Frequency offset estimator 34 receives the compensated signal from frequency offset compensator 30 and determines a frequency offset estimate from the signal. Frequency offset estimator 34 provides the frequency offset estimate as feedback to frequency offset compensator 30. Frequency offset estimator 34 is described in more detail with reference to FIG. 2.

Frequency offset compensator 30 compensates a next frequency offset of the signal according to the feedback, which may yield a constellation diagram 54 that indicates that there is still a relatively small amount of phase noise. Frequency offset compensator 30 sends the signal to carrier and data recovery module 36. Carrier and data recovery module 36 recovers the carrier wave, which may yield a signal with the constellation profile 58.

Update of the frequency offset estimate for frequency offset compensator 30 may be performed at any suitable rate. In particular embodiments, changes in the frequency offset may occur at a rate that is slower than the data modulation rate, so the frequency offset need not be updated at the same rate as the data modulation rate.

Referring to FIG. 1B, in particular embodiments, system 10 may support a polarization diversity receiver. System 10 may overcome the problem of polarization dependence. In addition, if an incoming signal is polarization multiplexed, system 10 may demultiplex the polarization components.

In the illustrated example, system 10 includes polarization beam splitters (PBSs) 19 (19a, 19b). PBS 19a separates an incoming signal from a transmitter into X/Y components comprising an X-polarized incoming component and a Y-polarized incoming component. PBS 19b separates a reference signal from local oscillator (LO) 18 into X/Y components comprising an X-polarized reference component and a Y-polarized reference component. Local oscillator laser (LO) has X and Y polarization components. The X-polarized components travel along an X-path 62, and the Y-polarized components travel along a Y-path 64.

In the illustrated example, a reference number ending in "x" indicates that the referenced object belongs to X-path 62, and a reference number ending in "y" indicates that the referenced object belongs to Y-path 64. Paths 62 and 64 include a local oscillator (LO) 18, 90° optical hybrids 20 x/y, detectors 21 (21ax/y, 21bx/y), analog-to-digital converters (ADCs) 22 (22ax/y, 22bx/y), an equalizer 26, frequency offset compensators 30x/y, frequency offset estimators 34x/y, and carrier and data recovery modules 36x/y, which may operate in a manner substantially similar to that described with reference to FIG. 1A.

Figure 2:
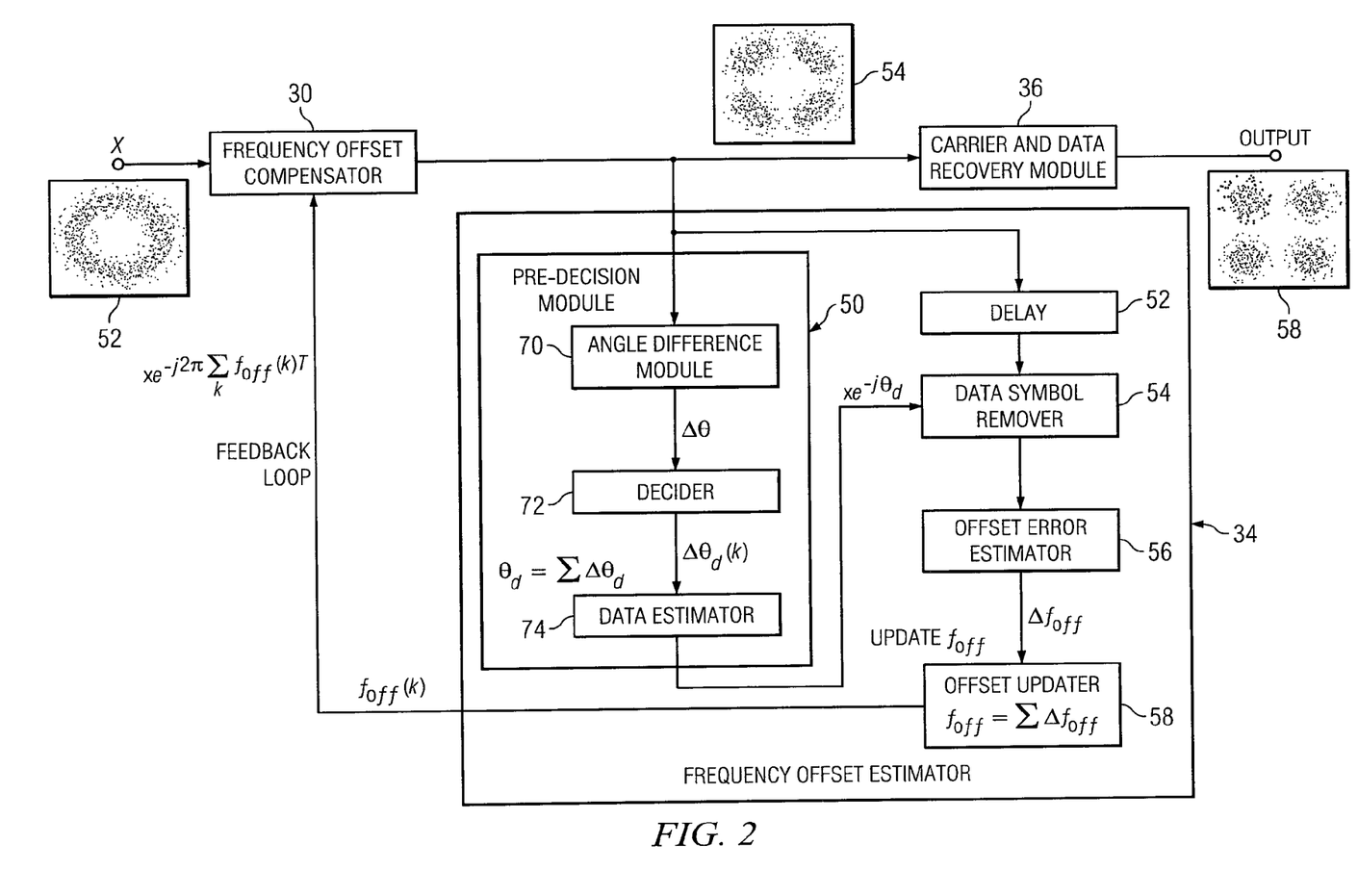
FIG. 2 illustrates an example of a frequency offset estimator that may be used with the systems of FIG. 1.

Referring to FIG. 1C, in particular embodiments, system 10 includes a local oscillator (LO) 18, PBSs 19x/y, 90° optical hybrids 20 x/y, detectors 21 (21ax/y, 21bx/y), analog-to-digital converters (ADCs) 22 (22ax/y, 22bx/y), an equalizer 26, frequency offset compensators 30x/y, a frequency offset estimator 34, and carrier and data recovery modules 36x/y, which may operate in a manner substantially similar to that described with reference to FIGS. 1A and/or 1B. In particular embodiments, system 10 may include an averager 33 that takes the average of the frequency offset compensated polarized components and sends the average to frequency offset estimator 34, which may improve accuracy. FIG. 2 illustrates an example of a frequency offset estimator 34 that may be used with system 10 of FIG. 1. In certain embodiments, frequency offset estimator 34 includes a pre-decision module 50, a delay 52, a data symbol remover 54, an offset error estimator 56, and an offset updater 58. Pre-decision module 50 includes an angle difference module, a decider 72, and a data estimator 74.

Frequency offset estimator 34 estimates the frequency offset in any suitable manner. In particular embodiments, pre-decision module 50 identifies data symbols of the signal, data symbol remover 54 removes the data symbols from the signal, and offset error estimator 56 and offset updater 58 determine the frequency offset estimate from the remaining signal.

Pre-decision module 50 identifies data symbols of the signal in any suitable manner. In particular embodiments, angle difference module 70 determines an angle difference $\Delta\theta$ between consecutive symbols. Decider and data estimator 74 identify the data symbol that corresponds to the angle difference according to the modulation format of system 10. In particular embodiments, decider 72 determines the phase-shifts $\Delta\theta_d(k)$ that match (that is, are closest) to the angle differences, and data estimator 74 determines the data symbols $\theta_d = \Sigma\Delta\theta_d(k)$ that corresponds to the phase-shifts.

Delay 52 delays the signal until the data symbol remover 54 receives the data symbol identified by pre-decision module 50. Data symbol remover 54 removes the data symbols from the delayed signal in any suitable manner. In particular embodiments, data symbol remover 54 applies $\times e^{-j\theta_d}$ to the signal. After the data symbols have been removed, the rotation of the remaining signal is due mainly to the frequency offset.

Offset error estimator 56 and offset updater 58 determine the frequency offset estimate from the remaining signal in any suitable manner. In particular embodiments, offset error estimator 56 determines a frequency offset error $\Delta f_{off}$ from the signal from which the data symbols have been removed. Error $\Delta f_{off}$ is the frequency offset estimation error after compensation of the frequency offset $f_{off}$ by the feedback loop. Offset error estimator 56 is described in more detail with reference to FIG. 3. Offset updater 58 integrates the frequency offsets errors $\Delta f_{off}$ to yield frequency offset estimate $f_{off} = \Sigma \Delta f_{off}$, and sends frequency offset estimate $f_{off}(k)$ for sample k as feedback. In certain embodiments, feedback loop delay may not be a concern, because changes in the frequency offset may occur in a sufficiently slow manner.

In certain embodiments, if the signal is polarization multiplexed, the frequency offset estimate may be averaged from the X and Y polarization components. In certain embodiments, if the argument of the signal is calculated before the delay and differential modulator, then the angles may be added or subtracted instead of multiplying the complex signal.

Frequency offset compensator 30 compensates a next frequency offset of the signal according to the feedback in any suitable manner. In particular embodiments, frequency offset compensator 30 applies $\times e^{-j2\pi\Sigma f_{off}(k)T}$ to the signal, where T represents the symbol period.

Figure 3:
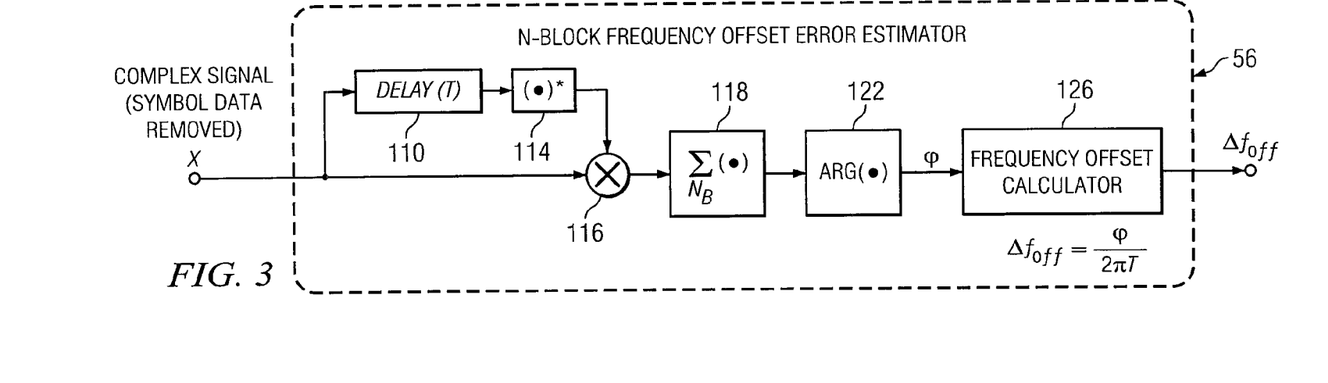
FIG. 3 illustrates an example of an N-block frequency offset error estimator that may be used with the frequency offset estimator of FIG. 2.

FIG. 3 illustrates an example of an N-block frequency offset error estimator 56 that may be used with frequency offset estimator 34 of FIG. 2. N-block frequency offset error estimator 56 may take an average frequency offset over $N_B$ samples in order to estimate the frequency offset error.

In the illustrated example, offset error estimator 56 may include a delay 110, a conjugate module 114, a multiplier 116, a summer 118, an argument module 122, and a frequency offset calculator 126. In an example of operation, offset error estimator 56 receives a complex signal from which symbol data has been removed. The signal is split and sent to a delay 110 and multiplier 116. Delay 110 delays the signal and conjugate module 114 takes the conjugate (●)* of the delayed signal.

Combiner 116 combines the input signal with the signal from conjugate module 114 to yield an angle difference between consecutive samples. Summer 118 sums the angle differences of $N_B$ samples $$\sum_{N_B} (\bullet)$$

to yield an average angle difference over $N_B$ samples. Argument module 122 takes the argument of the complex signal to yield an average angle rotation arg(●)=φ. Frequency offset calculator 126 determines the frequency offset error from the average angle rotation according to $$\Delta f_{\mathit{off}} = \frac{\varphi}{2\pi T}.$$

Figure 4A:
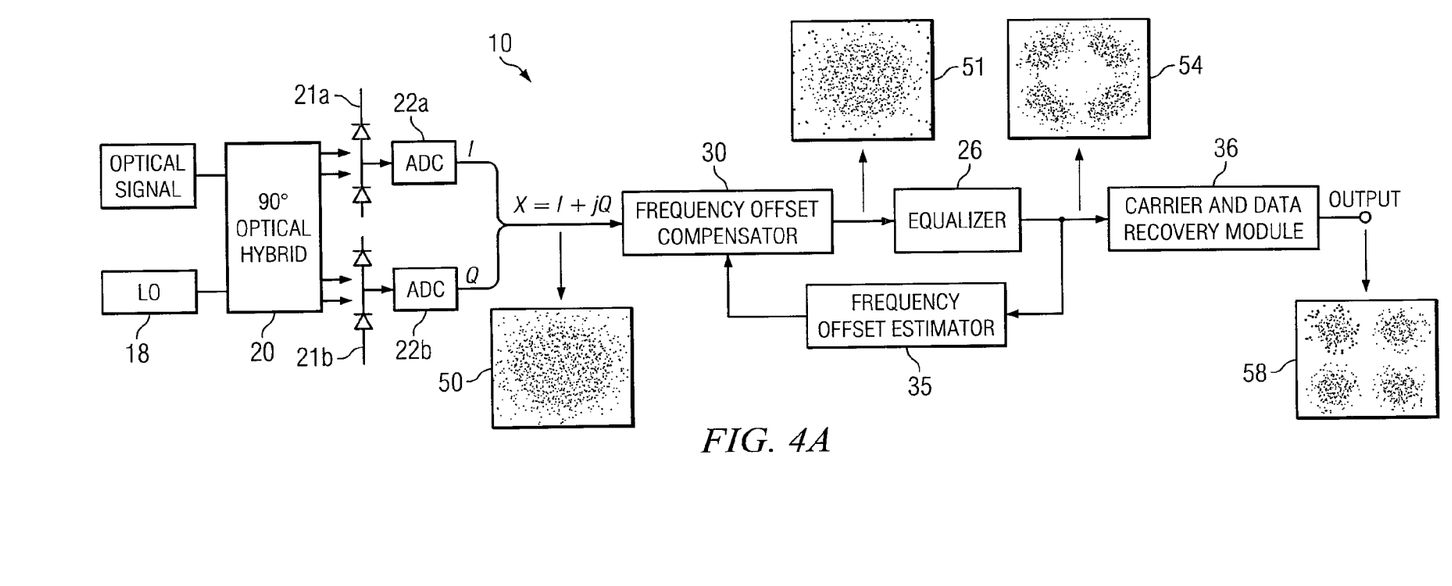
FIGS. 4A through 4C illustrate examples of systems that compensate for frequency offset using a frequency offset estimate provided prior to equalization.

FIG. 4 illustrates an example of a system 10 that compensates for frequency offset of a signal using a frequency offset estimate provided as feedback prior to equalizing the signal. In particular embodiments, system 10 includes local oscillator 18, 90° optical hybrid 20, detectors 21, analog-to-digital converters (ADCs) 22, equalizer 26, frequency offset compensator 30, frequency offset estimator 35, and carrier and data recovery module 36.

In certain embodiments, local oscillator 18, 90° optical hybrid 20, and analog-to-digital converters 22 operate in a manner substantially similar to that described with reference to FIG. 1, which may yield a signal with a constellation diagram 50. Frequency offset compensator 30 sends a compensated signal, which may be described by constellation diagram 51, to equalizer 26. Equalizer 26 processes n samples per symbol period, which may yield an equalized signal described by constellation diagram 54. Parameter n may have any suitable value, such as n=1, 2, 3, . . . . If equalizer 26 requires a full bandwidth of data, then n≧2. For example, chromatic dispersion compensation may require n=2. If equalizer 26 is only for polarization dispersion compensation, n=1 may be used. Equalizer 24 sends the equalized signal to carrier and data recovery module 36 and to frequency offset estimator 35.

In certain embodiments, frequency offset estimator 35 determines the frequency offset estimate from the equalized signal and sends the estimate to frequency offset compensator 30. Frequency offset estimator 35 is described in more detail with reference to FIG. 5. Carrier and data recovery module 36 may operate in a manner substantially similar to that described with reference to FIG. 1, which may yield an output signal described by constellation diagram 58.

Figure 4B:
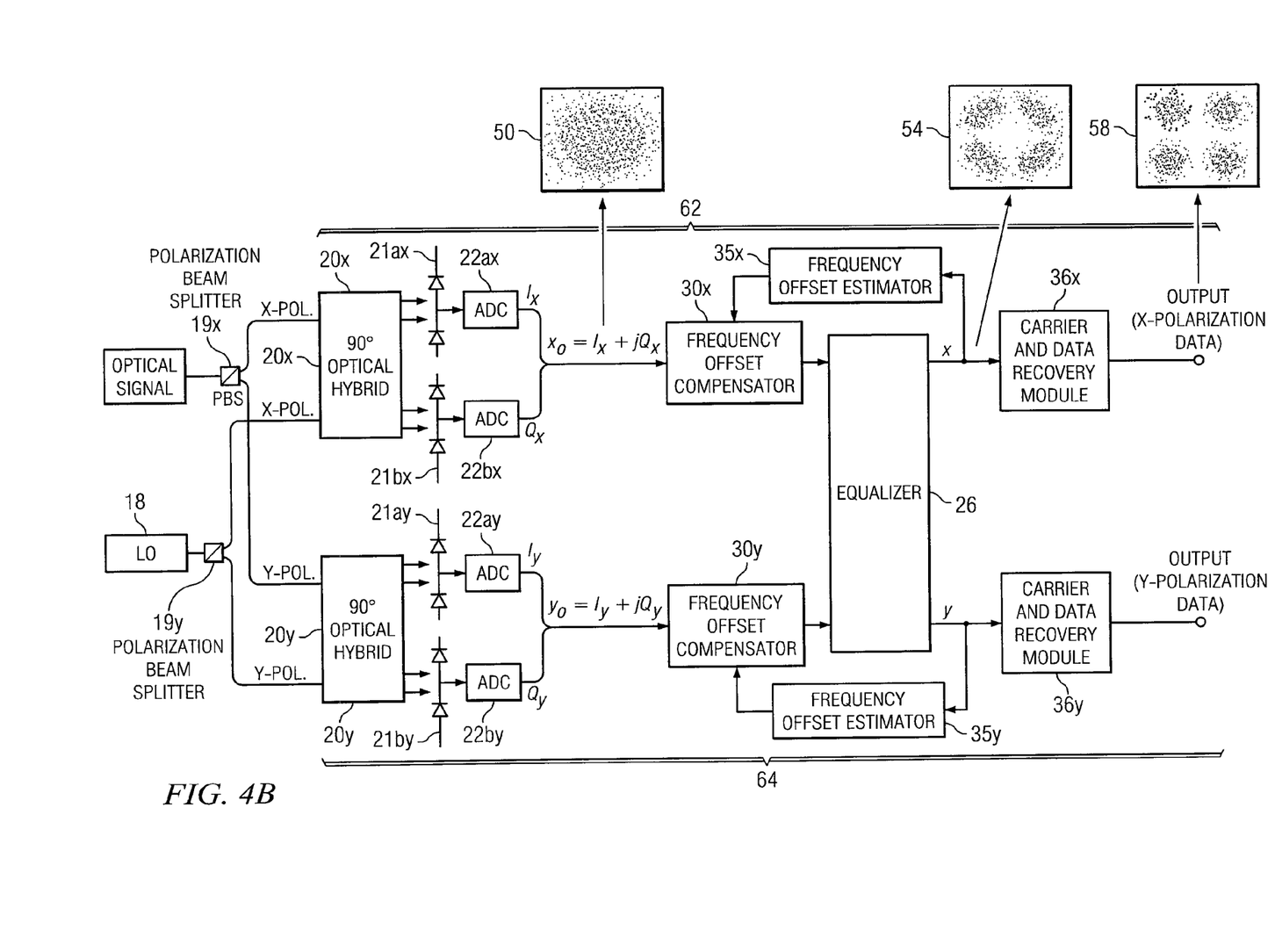

Referring to FIG. 4B, in particular embodiments, system 10 includes a local oscillator (LO) 18, PBSs 19x/y, 90° optical hybrids 20 x/y, detectors 21 (21ax/y, 21bx/y), analog-to-digital converters (ADCs) 22 (22ax/y, 22bx/y), an equalizer 26, frequency offset compensators 30x/y, frequency offset estimators 35x/y, and carrier and data recovery modules 36x/y, which may operate in a manner substantially similar to that described with reference to FIGS. 1A, 1B, 1C, and/or 4A.

Figure 4C:
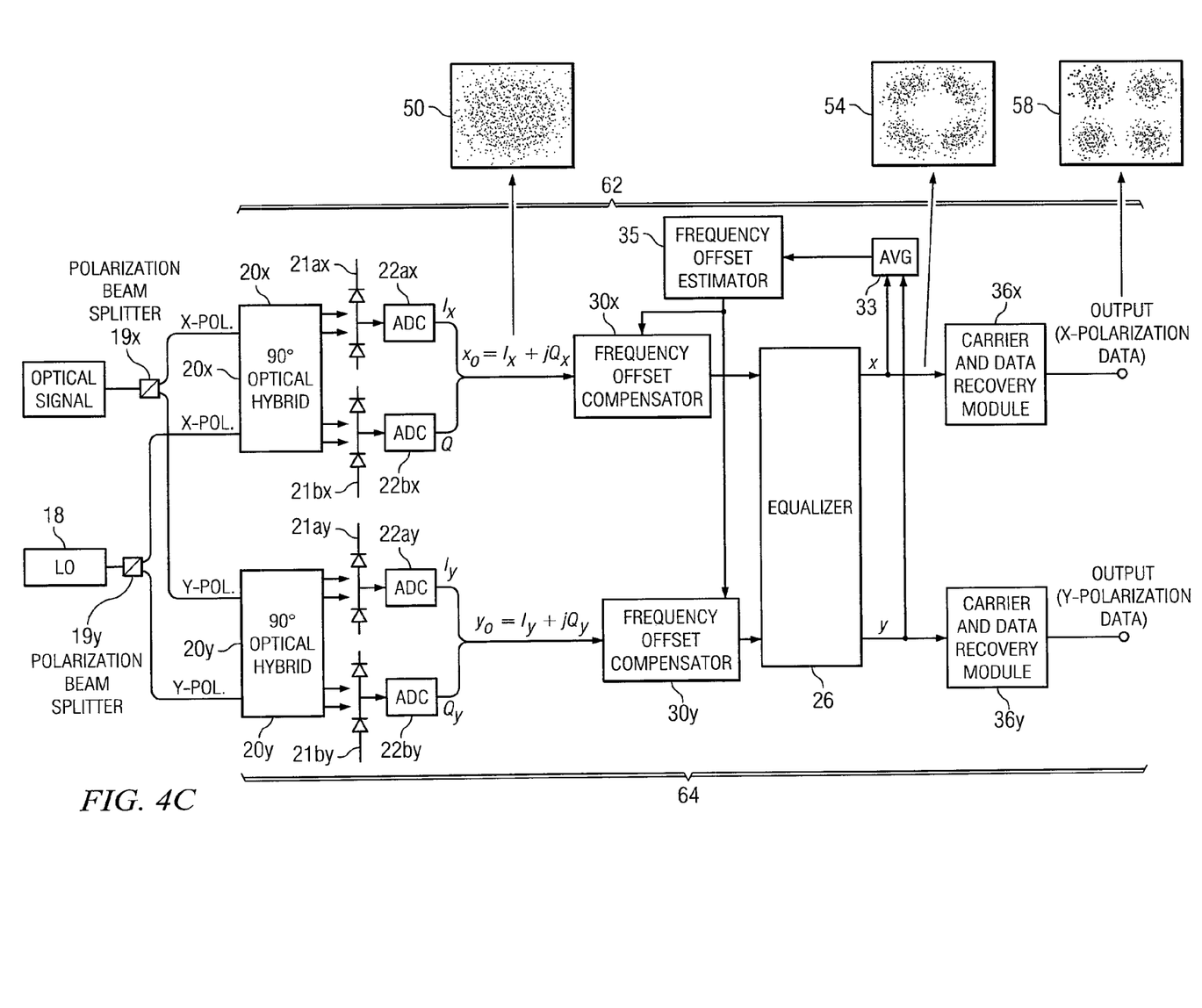

Referring to FIG. 4C, in particular embodiments, system 10 includes a local oscillator (LO) 18, PBSs 19x/y, 90° optical hybrids 20 x/y, detectors 21 (21ax/y, 21bx/y), analog-to-digital converters (ADCs) 22 (22ax/y, 22bx/y), an equalizer 26, frequency offset compensators 30x/y, a frequency offset estimator 35, an averager 33, and carrier and data recovery modules 36x/y, which may operate in a manner substantially similar to that described with reference to FIGS. 1A, 1B, 1C, 4A, and/or 4B.

Figure 5:
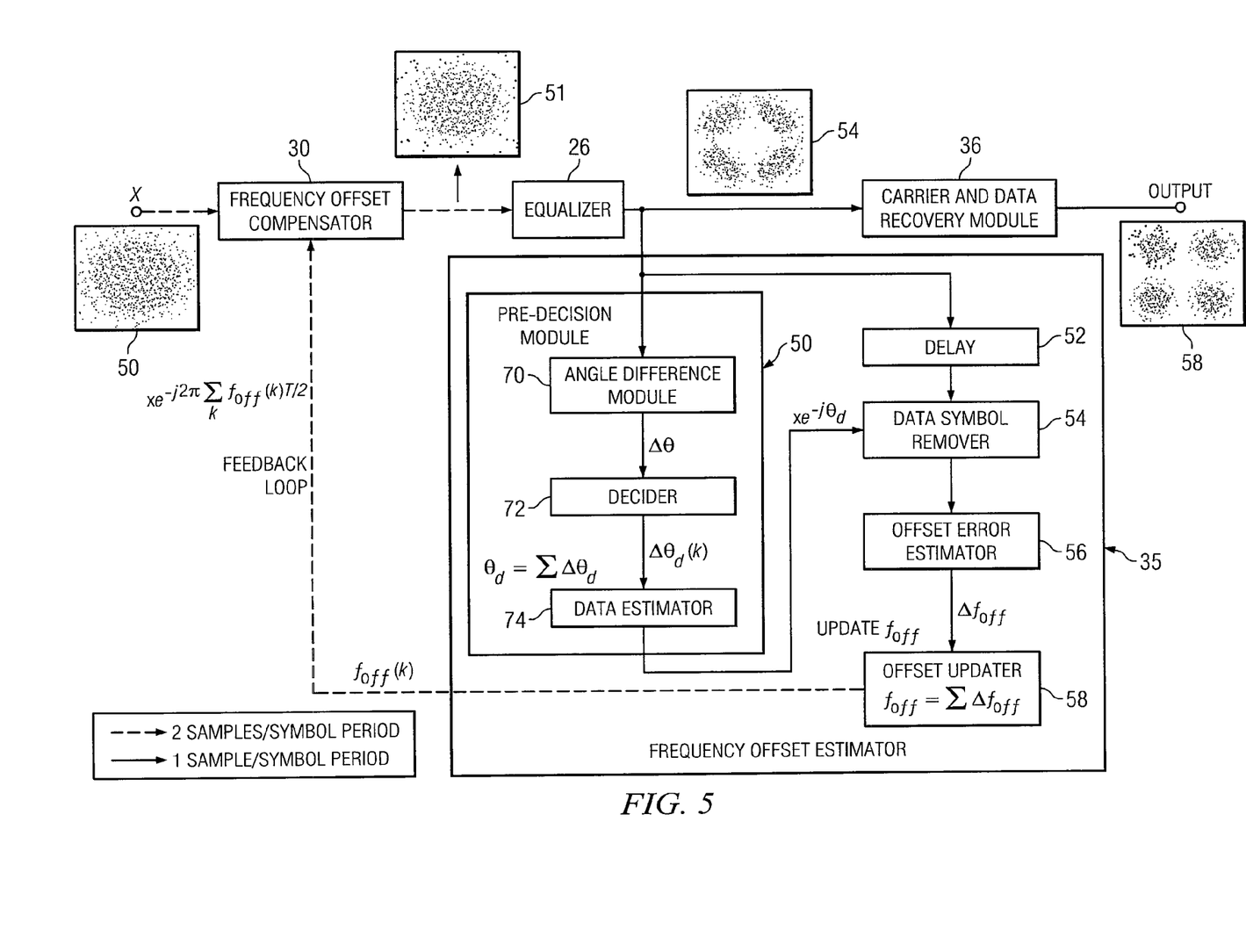
FIG. 5 illustrates an example of a frequency offset estimator that may be used with the systems of FIG. 4.

FIG. 5 illustrates an example of a frequency offset estimator 35 that may be used with system 10 of FIG. 4. In certain embodiments, frequency offset estimator 35 includes pre-decision module 50, delay 52, data symbol remover 54, offset error estimator 56, and offset updater 58. Pre-decision module 50 includes angle difference module, decider 72, and data estimator 74.

Frequency offset estimator 35 may operate in a manner substantially similar to that described with reference to FIG. 2, except that frequency offset estimator 35 determines a frequency offset estimate that takes into account the sampling by equalizer 26. The frequency offset estimate allows frequency offset compensator 30 to compensate the next frequency offset in accordance with the n samples per sample period. For example, the sample period by T may be divided by n, such that frequency offset compensator 30 applies× $e^{-j2\pi \Sigma f_{\mathit{off}}(k)T/n}$ to the signal, where T represents the symbol period.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic. For example, a digital signal processor (DSP), such as an application specific integrated circuit (ASIC) or a field-programmable gate array (FPGA) may be used.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of frequency offset compensator 30 and frequency offset estimator 34 may be performed by one component, or the operations of frequency offset estimator 34 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving an optical signal communicated from a transmitter to a receiver;
   separating the optical signal into an X-polarized component and a Y-polarized component;
   determining a frequency offset estimate for each of the X-polarized component and the Y-polarized component of the signal, the frequency offset estimate indicating a frequency difference between the transmitter and the receiver;
   averaging the frequency offset estimates for the X-polarized component with the Y-polarized component to determine an average frequency offset estimate;
   providing the average frequency offset estimate as feedback; and
   compensating for a next frequency offset according to the feedback using digital signal processing.

2. The method of claim 1, wherein the determining of the frequency offset estimate of the X-polarized component and the Y-polarized component of the signal comprises:
   identifying a plurality of data symbols of the X-polarized component and the Y-polarized component of the signal;
   respectively removing the identified plurality of data symbols of the X-polarized component and the Y-polarized component from the X-polarized component and the Y-polarized component of the signal; and
   determining the frequency offset estimate of the X-polarized component and the Y-polarized component from the respective remaining X-polarized component and the Y-polarized component of the signal.

3. The method of claim 1, wherein the determining of the frequency offset estimate of the X-polarized component and the Y-polarized component of the signal comprises determining a plurality of data symbols of the X-polarized component and the Y-polarized component of the signal by:
   determining an angle difference between consecutive symbols of a plurality of symbols of the X-polarized component and the Y-polarized component of the signal to yield a plurality of angle differences for each of the X-polarized component and the Y-polarized component; and
   identifying the plurality of data symbols of the X-polarized component and the Y-polarized component from the respective plurality of angle differences.

4. The method of claim 1, wherein the determining of the frequency offset estimate of the X-polarized component and the Y-polarized component of the signal comprises:
   removing a plurality of data symbols from the X-polarized component and the Y-polarized component of the signal;
   determining an average angle difference between consecutive samples of the remaining X-polarized component and the Y-polarized component of the signal for a plurality of consecutive samples to yield an average angle difference for the X-polarized component and an average angle difference for the Y-polarized component; and
   determining the frequency offset estimate of the X-polarized component and the Y-polarized component from the respective average angle difference.

5. The method of claim 1, wherein the determining of the frequency offset estimate of the X-polarized component and the Y-polarized component of the signal comprises:
   removing a plurality of data symbols from the X-polarized component and the Y-polarized component of the signal;
   determining an angle difference between consecutive samples of the remaining X-polarized component and the Y-polarized component of the signal for a plurality of consecutive samples to yield a plurality of angle differences for each of the X-polarized component and the Y-polarized component; and
   summing the respective plurality of angle differences.

6. The method of claim 1, wherein the receiving of the signal comprises:
   receiving the signal from a frequency offset compensator configured to receive the signal from an equalizer, the equalizer configured to reduce inter-symbol interference.

7. The method of claim 1:
   wherein the receiving of the signal comprises receiving the signal from an equalizer configured to reduce inter-symbol interference, the equalizer processing n samples per symbol period, wherein n is an integer greater than zero; and
   the compensating for the next frequency offset according to the feedback comprises:
      compensating the next frequency offset in accordance with the n samples per symbol period; and
      sending the signal with the compensated next frequency offset to the equalizer.

8. The method of claim 1, the frequency difference is a frequency difference between a transmitter laser of the transmitter and a local oscillator of the receiver.

9. An apparatus comprising:
   an interface configured to:
      receive an optical signal communicated from a transmitter to a receiver; and
      separate the optical signal into an X-polarized component and a Y-polarized component; and
   one or more processors configured to:
      determine a frequency offset estimate for each of the X-polarized component and the Y-polarized component of the signal, the frequency offset estimate indicating a frequency difference between the transmitter and the receiver;
      average the frequency offset estimates for the X-polarized component with the Y-polarized component to determine an average frequency offset estimate;
      provide the average frequency offset estimate as feedback; and
      compensate for a next frequency offset according to the feedback using digital signal processing.

10. The apparatus of claim 9, wherein the one or more processors is configured to determine the frequency offset estimate of the X-polarized component and the Y-polarized component of the signal by being configured to:
  identify a plurality of data symbols of the X-polarized component and the Y-polarized component of the signal;
  respectively remove the identified plurality of data symbols of the X-polarized component and the Y-polarized component from the X-polarized component and the Y-polarized component of the signal; and
  determine the frequency offset estimate of the X-polarized component and the Y-polarized component from the respective remaining X-polarized component and the Y-polarized component of the signal.

11. The apparatus of claim 9, wherein the one or more processors is configured to determine the frequency offset estimate of the X-polarized component and the Y-polarized component of the signal by determining a plurality of data symbols of the signal by being configured to:
  determine an angle difference between consecutive symbols of a plurality of symbols of the X-polarized component and the Y-polarized component of the signal to yield a plurality of angle differences for each of the X-polarized component and the Y-polarized component; and
  identify the plurality of data symbols of the X-polarized component and the Y-polarized component from the respective plurality of angle differences.

12. The apparatus of claim 9, wherein the one or more processors is configured to determine the frequency offset estimate of the X-polarized component and the Y-polarized component of the signal by being configured to:
  remove a plurality of data symbols from the X-polarized component and the Y-polarized component of the signal;
  determine an average angle difference between consecutive samples of the remaining X-polarized component and the Y-polarized component of the signal for a plurality of consecutive samples to yield an average angle difference for the X-polarized component and an average angle difference for the Y-polarized component; and
  determine the frequency offset estimate of the X-polarized component and the Y-polarized component from the respective average angle difference.

13. The apparatus of claim 9, wherein the one or more processors is configured to determine the frequency offset estimate of the X-polarized component and the Y-polarized component of the signal by being configured to:
  remove a plurality of data symbols from the X-polarized component and the Y-polarized component of the signal;
  determine an angle difference between consecutive samples of the remaining X-polarized component and the Y-polarized component of the signal for a plurality of consecutive samples to yield a plurality of angle differences for each of the X-polarized component and the Y-polarized component; and
  sum the respective plurality of angle differences.

14. The apparatus of claim 9, wherein the interface is configured to receive the signal by being configured to:
  receive the signal from a frequency offset compensator configured to receive the signal from an equalizer, the equalizer configured to reduce inter-symbol interference.

15. The apparatus of claim 9:
  wherein the interface is configured to receive the signal from an equalizer configured to reduce inter-symbol interference, the equalizer is configured to process n samples per symbol period, wherein n is an integer greater than zero; and
  the one or more processors is configured to compensate for the next frequency offset according to the feedback by being configured to:
  compensate the next frequency offset in accordance with the n samples per symbol period; and
  send the signal with the compensated next frequency offset to the equalizer.

16. The apparatus of claim 9, the frequency difference is a frequency difference between a transmitter laser of the transmitter and a local oscillator of the receiver.

17. One or more processors configured to execute instructions to:
  receive an optical signal communicated from a transmitter to a receiver;
  separate the optical signal into an X-polarized component and a Y-polarized component;
  determine a frequency offset estimate for each of the X-polarized component and the Y-polarized component of the signal, the frequency offset estimate indicating a frequency difference between the transmitter and the receiver, the frequency difference being a frequency difference between a transmitter laser of the transmitter and a local oscillator of the receiver;
  average the frequency offset estimates for the X-polarized component with the Y-polarized component to determine an average frequency offset estimate;
  provide the average frequency offset estimate as feedback; and
  compensate for a next frequency offset according to the feedback using digital signal processing.

18. The processors of claim 17, wherein the one or more processors is configured to determine the frequency offset estimate of the X-polarized component and the Y-polarized component of the signal by being configured to:
  identify a plurality of data symbols of the X-polarized component and the Y-polarized component of the signal;
  respectively remove the identified plurality of data symbols of the X-polarized component and the Y-polarized component from the X-polarized component and the Y-polarized component of the signal; and
  determine the frequency offset estimate of the X-polarized component and the Y-polarized component from the respective remaining X-polarized component and the Y-polarized component of the signal.

19. The processors of claim 17, wherein the one or more processors is configured to determine the frequency offset estimate of the X-polarized component and the Y-polarized component of the signal by determining a plurality of data symbols of the X-polarized component and the Y-polarized component of the signal by being configured to:
  determine an angle difference between consecutive symbols of a plurality of symbols of the X-polarized component and the Y-polarized component of the signal to yield a plurality of angle differences for each of the X-polarized component and the Y-polarized component; and
  identify the plurality of data symbols of the X-polarized component and the Y-polarized component from the respective plurality of angle differences.

20. The processors of claim 17, wherein the one or more processors is configured to determine the frequency offset estimate of the X-polarized component and the Y-polarized component of the signal by being configured to:
  remove a plurality of data symbols from the X-polarized component and the Y-polarized component of the signal;
  determine an average angle difference between consecutive samples of the remaining X-polarized component and the Y-polarized component of the signal for a plurality of consecutive samples to yield an average angle difference for the X-polarized component and an average angle difference for the Y-polarized component; and
  determine the frequency offset estimate of the X-polarized component and the Y-polarized component from the respective average angle difference.

* * * * *